J. EDWARDS.
CREAM CONE FILLER.
APPLICATION FILED AUG. 2, 1909.

990,479.

Patented Apr. 25, 1911.

Inventor
Joseph Edwards.

Witnesses

UNITED STATES PATENT OFFICE.

JOSEPH EDWARDS, OF DUNCAN, OKLAHOMA.

CREAM-CONE FILLER.

990,479.  Specification of Letters Patent.  Patented Apr. 25, 1911.

Application filed August 2, 1909. Serial No. 510,813.

*To all whom it may concern:*

Be it known that I, JOSEPH EDWARDS, a citizen of the United States, residing at Duncan, in the county of Stephens and State of Oklahoma, have invented a new and useful Cream-Cone Filler, of which the following is a specification.

This invention has relation to ice cream cone fillers and it consists in the novel construction and arrangement of its parts as hereinafter shown and described.

The object of the invention is to provide a simple and effective hand implement adapted to receive an ice cream cone and which may be dipped into a can of ice cream or the like whereby the cone may be rapidly filled without danger of breaking or injuring the same.

The filler is provided with an annular rim hingedly attached to its body which is adapted to protect the edge of the cone during the filling operation and said filler is further provided with a plunger adapted to be manipulated for the purpose of elevating the upper edge of the cone above the filler so that it may be readily removed therefrom.

Figure 1:
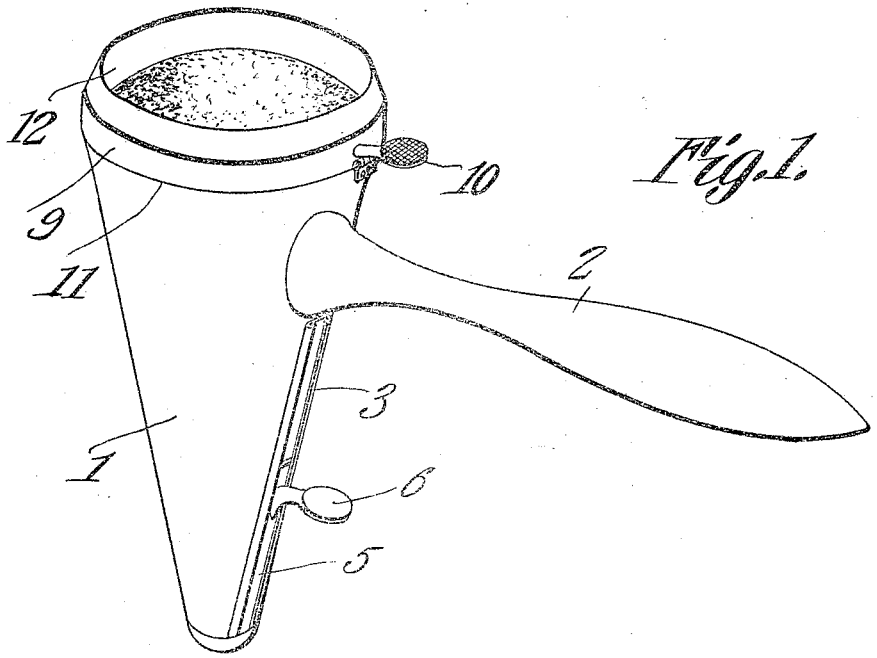
Figure 2:
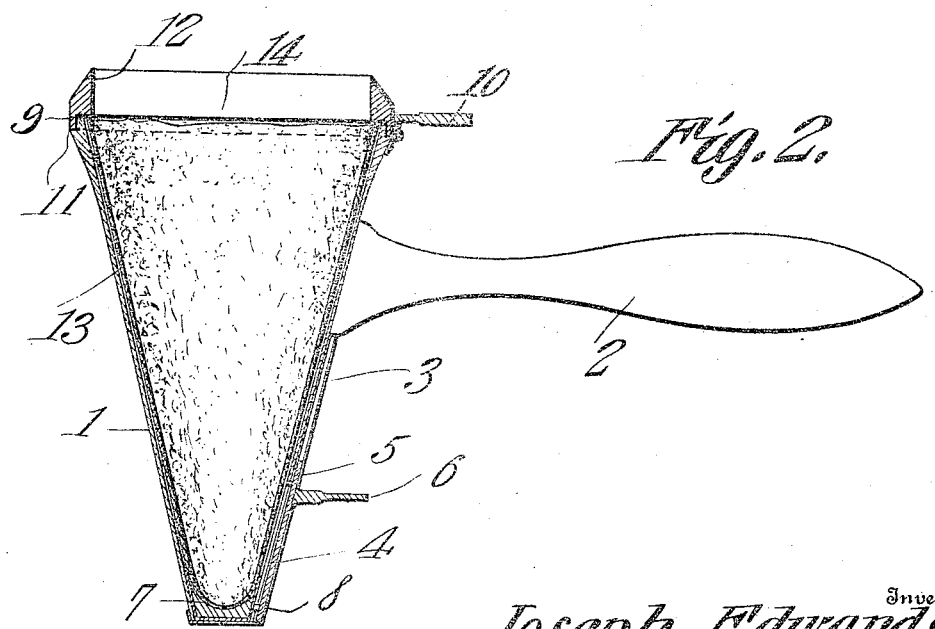

In the accompanying drawings: Figure 1 is a perspective view of the filler. Fig. 2 is a vertical sectional view of the same.

The filler includes a conical hollow body 1 to which is attached a laterally disposed handle 2. A guide 3 is mounted upon the lower or outer portion of the body 1 and the lower portion of the said body and the lower portion of the said guide are slotted as at 4 (see Fig. 2). A slide 5 is loosely mounted in the guide 3 and is adapted to move longitudinally thereof. A handle 6 is fixed to the said slide and projects beyond the guide 3 and the side of the body 1. The said handle 6 is located under the handle 2. A cup 7 is fixed to the lower portion of the slide 5 by means of a bolt 8 or its equivalent which passes transversely through the slot 4 and is attached at one end to said slide and at its other end to the said cup. A ring 9 is hingedly attached to the upper portion of the body 1 and is provided with a stop lug 10 located above the handle 2. The said ring 9 includes a flange 11 which is adapted to overlap the upper edge portion of the body 1 when the said ring is closed down upon the body and the said ring 9 is provided with a relatively sharp annular upper cutting edge 12.

The body 1 is adapted to receive an ice cream cone 13 which when in position upon the body rests at its apex in the cup 7 and its edge lies under an inwardly disposed annular shoulder 14 provided upon the ring 9.

The cone filler is manipulated as follows: Presuming that a cone 13 is placed in the body 1 in the position as illustrated in Fig. 2 and the parts of the filler are also in position as illustrated in the said figure it is apparent that the larger end portion of the body 1 may be dipped into a vessel containing the ice cream and that the cream will be cut by the edge 12 of the ring 9 and forced into the body of the cone 13 without coming in direct or frictional contact with the edge thereof. Thus the said cone 13 may be filled with the ice cream without damaging the cone. When the cone has been filled the filler is lifted out of the ice cream vessel and the operator depresses the lug 10 whereby the ring 9 swings up upon its axis above the upper edge of the body 1. Then the operator passes a finger under the handle 6 and elevates the slide 5 and its attachment. Thus the cone 13 with its contents is raised in the body 1 and the upper edge of the cone projects beyond the upper edge of the said body. The operator may then grasp the upper edge of the cone 13 and lift the same and its contents from the filler.

Having described my invention what I claim as new and desire to secure by Letters Patent is:

In a device for filling ice cream cones, the combination with a holder adapted to receive a cone, said holder having a rabbeted outer edge, of a displaceable rim having a cutting edge, and a depending flange adapted to fit into the rabbeted portion of the holder, said rim also having a shoulder projecting inward over the upper edge of the holder and adapted to protect the upper edge of the cone in said holder.

In testimony that I claim the foregoing as my own, I have hereto affixed my signature in the presence of two witnesses.

JOSEPH EDWARDS.

Witnesses:
R. E. CAMPBELL,
J. P. PRENTICE.

Copies of this patent may be obtained for five cents each, by addressing the "Commissioner of Patents, Washington, D. C."